F. M. ASHLEY.
INKSTAND.
APPLICATION FILED MAR. 10, 1917.
1,361,355.
Patented Dec. 7, 1920.
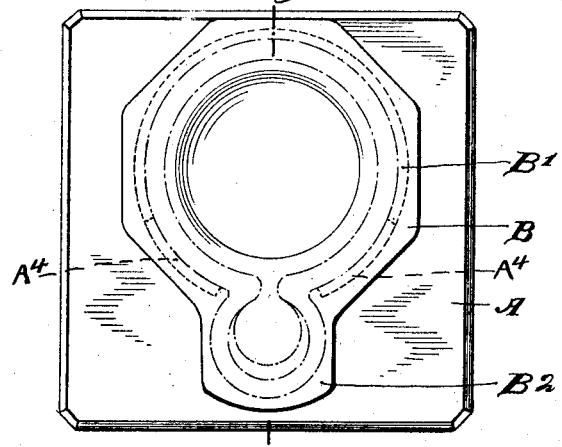
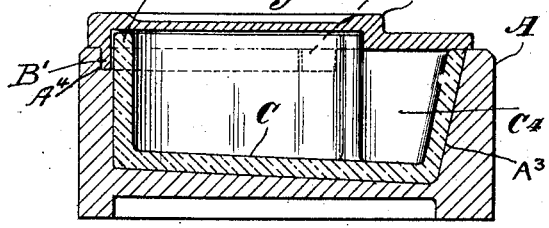
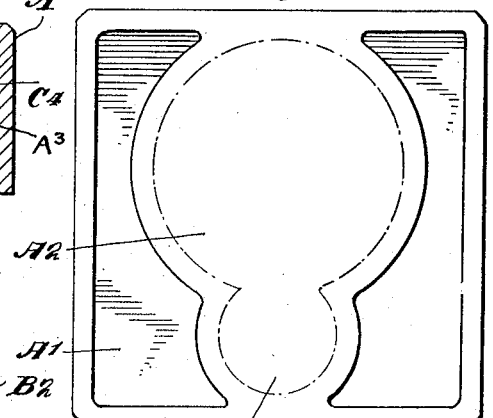
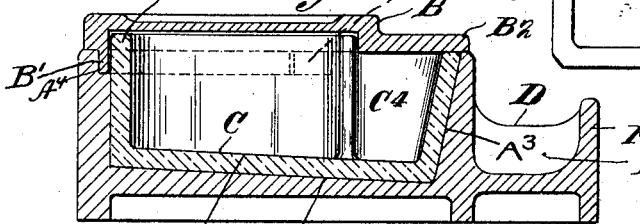
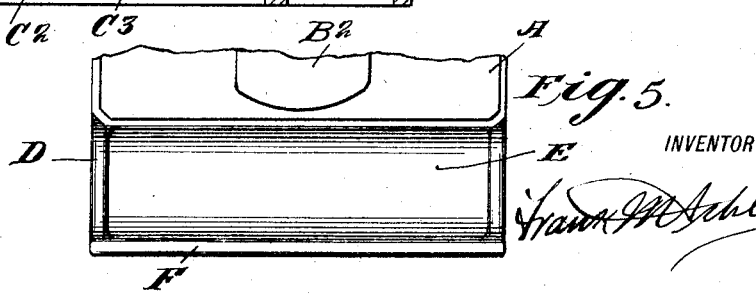
INVENTOR
Frank M Ashley

UNITED STATES PATENT OFFICE.

FRANK M. ASHLEY, OF BROOKLYN, NEW YORK.

INKSTAND.

1,361,355. Specification of Letters Patent. Patented Dec. 7, 1920.

Application filed March 10, 1917. Serial No. 153,828.

*To all whom it may concern:*

Be it known that I, FRANK M. ASHLEY, a citizen of the United States, and resident of New York city, borough of Brooklyn, in the county of Kings and State of New York, have invented certain new and useful Improvements in Inkstands, of which the following is a specification.

My invention relates to inkstands, and the object of my invention is to provide a simple and strong construction which will reduce the liability of the reservoir being broken and in case it is broken, to renew it at a low cost, and also to permit the base portion to serve as a reservoir and be provided with a cover guided by means formed in the base for the time required to secure a new glass reservoir.

A further object is to provide a cover that will be more stable on the base portion than stands of this type heretofore constructed without reducing the capacity of the reservoir for a stand of a given height.

Referring to the drawings which form a part of this specification,

Figure 1 is a plan view of my improved inkstand.

Fig. 2 is a longitudinal sectional view, and Fig. 3 is a view of the under side of the base portion of the construction shown in Fig. 1.

Fig. 4 is a longitudinal sectional view of a stand having a pen rack extension in the front portion of the base with a pin tray construction combined therewith.

Fig. 5 is a plan view of a portion of the base disclosing the pen rack and pin tray construction.

A indicates the base portion preferably made of a strong plastic composition; B, the cover, also preferably made of a plastic material, and C, the reservoir preferably made of glass.

The base is cored on the under side, as shown at $A'$, to save material and also to allow the plastic to set quickly. The base is provided with a recess $A^2$ to receive the glass reservoir C, and also an extension of said recess indicated by $A^3$ to receive the dip cup portion of the glass reservoir, and which may also be used temporarily as the dip cup in case the glass reservoir is broken or removed, the recess $A^2$ in this event serving as the reservoir proper.

The glass reservoir is made to fit into the recesses of the base and a top circular rim portion $C'$ projects above the top plane surface of the base to serve as an additional guide for the cover. The cover is normally guided by the depending circular portion $B'$ which projects into an annular guideway $A^4$ formed in the base, the ends of which serve as abutments to limit the movement of the cover. The glass reservoir extension in which the dip is located is formed on a plane lower than that of the top of the rim $C'$ so that the projecting portion $B^2$ of the cover rests on the top of the base or body portion of the stand and is always supported thereby. The dip is opened or closed by rotating the cover on the body portion. I prefer to form the reservoir with an inclined bottom as shown at $C^2$ and in this event, I also form the bottom of the recess $A^2$ with a corresponding incline to support the reservoir. By this construction, I save some glass and reduce the weight of the stand and also provide a way to cause all the ink to eventually flow into the dip cup $C^4$.

The pen rack is formed by two ribs D—D respectively and the pin tray E is formed by said ribs and the front wall F, as will be readily understood.

Having thus described my invention, I claim as new:

An inkstand comprising a base portion having a recess to receive a receptacle for ink; an ink receptacle resting in said base portion having a circular portion extending above the same and a portion disposed in a plane with the top thereof; and a cover having a depending flange extending around said circular portion of the ink receptacle and having an extension overlying the portion disposed on the plane of the top of the base; said cover being rotatably mounted on the base.

Signed at New York city, in the county of New York and State of New York, this 8th day of March A. D. 1917.

FRANK M. ASHLEY.

Witnesses:
HARRY C. HEBIG,
JOHN S. COLLINS.